United States Patent
Ciet et al.

(10) Patent No.: US 8,094,816 B2
(45) Date of Patent: Jan. 10, 2012

(54) SYSTEM AND METHOD FOR STREAM/BLOCK CIPHER WITH INTERNAL RANDOM STATES

(75) Inventors: Mathieu Ciet, Paris (FR); Augustin J. Farrugia, Cupertino, CA (US); Filip Toma Paun, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 601 days.

(21) Appl. No.: 12/255,539

(22) Filed: Oct. 21, 2008

(65) Prior Publication Data

US 2010/0098244 A1 Apr. 22, 2010

(51) Int. Cl.
*H04K 1/00* (2006.01)
*H04L 9/00* (2006.01)

(52) U.S. Cl. ............ 380/29; 380/28; 380/37; 380/255; 380/259

(58) Field of Classification Search .............. None
See application file for complete search history.

(56) References Cited

U.S. PATENT DOCUMENTS

| | | | |
|---|---|---|---|
| 2002/0191784 A1* | 12/2002 | Yup et al. | 380/37 |
| 2003/0002664 A1* | 1/2003 | Anand | 380/37 |
| 2005/0195974 A1* | 9/2005 | Kurdziel | 380/29 |
| 2007/0140478 A1* | 6/2007 | Komano et al. | 380/28 |
| 2008/0019503 A1* | 1/2008 | Dupaquis et al. | 380/28 |

\* cited by examiner

*Primary Examiner* — Shin-Hon Chen
(74) *Attorney, Agent, or Firm* — Nocak Druce + Quigg LLP (57) ABSTRACT

Disclosed herein are systems, methods, and computer readable-media for performing data encryption and decryption using a stream or block cipher with internal random states. The method includes splitting the input data into a predetermined number of blocks and processing each block. The processing includes creating sub-blocks, permuting the subblocks, replacing bytes using a lookup table, rotating bits, performing expansion and combining sets of bits. The element of randomness employed in this process allows for the same input to yield the same output, with differing internal states.

24 Claims, 7 Drawing Sheets

RUBIC OPERATION (EXAMPLE PERMUTATION) INPUT

402 —
| 0 | 1 | 2 | 3 |
|---|---|---|---|
| 4 | 5 | 6 | 7 |
| 8 | 9 | 10 | 11 |
| 12 | 13 | 14 | 15 |

CHANGED USING P FUNCTION INTO:

| 12 | 9 | 6 | 3 |
|---|---|---|---|
| 0 | 13 | 10 | 7 |
| 4 | 1 | 14 | 11 |
| 8 | 5 | 2 | 15 |
— 404

CHANGED INTO $Q_0$ OR $Q_1$:

$Q_0$:

406 —
| 6 | 3 | 12 | 9 |
|---|---|---|---|
| 10 | 7 | 0 | 13 |
| 14 | 11 | 4 | 1 |
| 2 | 15 | 8 | 5 |

$Q_1$:

| 9 | 6 | 3 | 12 |
|---|---|---|---|
| 10 | 7 | 0 | 13 |
| 11 | 4 | 1 | 14 |
| 15 | 8 | 5 | 2 |
— 408

|  0 |  1 |  2 |  3 |
|----|----|----|----|
|  4 |  5 |  6 |  7 |
|  8 |  9 | 10 | 11 |
| 12 | 13 | 14 | 15 |

602

| 12 |  9 |  6 |  3 |
|----|----|----|----|
|  0 | 13 | 10 |  7 |
|  4 |  1 | 14 | 11 |
|  8 |  5 |  2 | 15 |

604

| $V_0$ | $V_1$ | $V_2$ | $V_3$ |
|----|----|----|----|
|  9 |  6 |  3 | 12 |
| 10 |  7 |  0 | 13 |
| 11 |  4 |  1 | 14 |
| 15 |  8 |  5 |  2 |

606

SYSTEM AND METHOD FOR STREAM/BLOCK CIPHER WITH INTERNAL RANDOM STATES

BACKGROUND OF THE INVENTION

1. Field of the Invention

The present invention relates to computer security and more specifically to data encryption and decryption.

2. Introduction

Cryptography is a method to protect digital content by systematically obscuring data so it appears unintelligible to an adversary. The objective of cryptography is to enable users to communicate securely in an insecure environment, while maintaining data integrity, privacy and user authentication. Over time, many cryptography systems have been developed, some requiring a great deal of resources to break. When an adversary recovers the secret key used to protect digital content, the system has been compromised and is no longer secure.

A cipher is an algorithm to perform encryption or decryption. There are various forms of ciphers, including block and stream ciphers. A block cipher encrypts data in blocks of a predetermined size, for instance 64-bits, 128-bits or 256-bits. A block cipher takes a plaintext block as input, operates on the block and outputs the encrypted block. Block ciphers often apply the same combination of techniques to data, referred to as rounds. For instance, a cipher applying the same combination of techniques to data 16 times operates using 16 rounds. A stream cipher typically encrypts plaintext one bit at a time. Encrypting 64-bits using a stream cipher that encrypts plaintext one bit at a time would require running the algorithm 64 times, as opposed to one iteration of a block-cipher that works on 64-bit blocks. Of course, the way a cipher operates depends on the specific application. Ciphers can be implemented in various ways, specifically white box, black box or side-channel resistant implementations.

White box cryptography is a cryptographic implementation designed to withstand a white box attack model. In the white box attack model, the adversary has access to the cryptographic software implementation and program execution. In the classical black box model, the attacker has access to only the input and output of the black box. The processes inside the black box are protected from the attacker and considered secure except using side-channel attacks requiring physical manipulation. White box solutions are typically slower and more cumbersome than black box solutions, due to their complexity. However, for some applications, the advantages of using white box solutions outweigh the disadvantages. Software-only white box solutions can be installed and updated remotely, whereas hardware black box solutions cannot without costly approaches. In the white box model, storing the private key in memory is insecure since the adversary has access to the entire system. One approach is to integrate the key into the encryption algorithm so that the key is never made explicit. This approach performs encryption in front of an attacker without ever revealing the secret key.

The well-known Data Encryption Standard (DES) is a block cipher used throughout the world for decades, later succeeded by the more secure Triple-DES. Triple-DES has been replaced in many applications by the widely studied and analyzed Advanced Encryption Standard (AES). AES is well suited for both software and hardware implementations, however for some light hardware implementations, the number of logic gates is too large. One such hardware implementation is Radio Frequency Identification (RFID). RFID is an automatic identification method that remotely retrieves data using a device referred to as an RFID tag or transponder. An example of an RFID tag is the device used for electronic toll collection.

Accordingly, what is needed in the art is an improved block or stream cipher implementation in the white box environment that is side-channel resistant for situations where classical cryptographic algorithms are not feasible.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed are systems, methods, and tangible computer readable-media for encrypting and decrypting data utilizing a stream cipher with internal random states. Data encryption and decryption is performed by selecting a predetermined number of input bits, applying similar operations on those input bits for a predetermined number of rounds, and outputting the result of an exclusive or of the pre-processed input bits with the processed input bits. For each round, data is manipulated by: constructing first blocks using one of output bits from a previous round or the selected input bits; permuting the first blocks relative to respective block positions; decomposing the first blocks into a first set of bytes; generating a second set of bytes by replacing at least a portion of the first set of bytes using a lookup table; constructing second blocks using the second set of bytes; rotating the bits in each block of the second blocks; decomposing the second blocks to form a first set of bits; expanding the first set of bits; generating a round key from an existing key; adding the round key to the expanded bits to generate a second set of bits; and reducing the second set of bits to generate a set of output bits for a respective round. The set of output bits are used as input to the process again for the next round except for the last round. After the last round, an exclusive or of the output bits and the input bits is performed and output respectively as ciphertext or plaintext. In another aspect of this disclosure, the algorithm can be modified to obtain a block cipher by having all of the operations invertible.

The advantage of implementing a cipher with internal random states is that intermediate values are not exposed directly but protected by adding randomness inside the encryption and decryption process. For two executions of the algorithm on identical input data, the intermediate values are different. This process makes it difficult for an attacker to follow in computer memory.

One embodiment also applies to a system, method and tangible computer-readable medium to decrypt the encrypted data.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
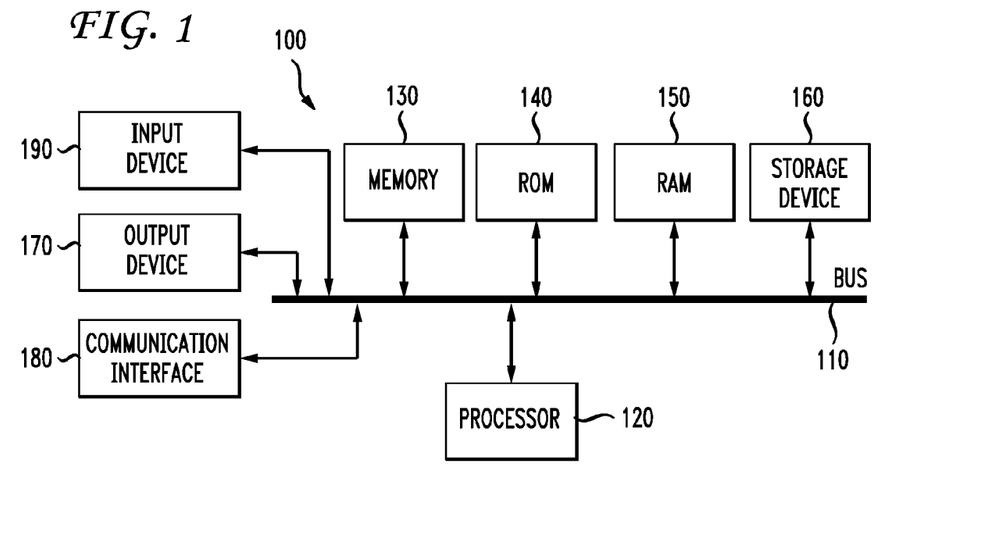
FIG. 1 illustrates an example system embodiment.

With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. A processing unit 120 can include a general purpose CPU controlled by software as well as a special-purpose processor. Particular functionality may also be built into the design of a separate computer chip. Of course, a processing unit includes any general purpose CPU and a module configured to control the CPU as well as a special-purpose processor where software is effectively incorporated into the actual processor design. A processing unit may essentially be a completely self-contained computing system, containing multiple cores or CPUs, a bus, memory controller, cache, etc. A multi-core processing unit may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. In one aspect, a hardware module that performs a particular function includes the software component stored in a tangible computer-readable medium in connection with the necessary hardware components, such as the CPU, bus, display, and so forth, to carry out the function. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software and hardware, such as a processor, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. An example system for both encryption and decryption are discussed next.

A system for data encryption includes: a module configured to select a predetermined number of input bits and for a predetermined number of rounds: a module configured to construct first blocks using one of output bits from a previous round or the selected input bits; a module configured to permute the first blocks relative to respective block positions; a module configured to decompose the first blocks into a first set of bytes; a module configured to generate a second set of bytes by replacing at least a portion of the first set of bytes using a lookup table; a module configured to construct second blocks using the second set of bytes; a module configured to rotate bits in each block of the second blocks; a module configured to decompose the second blocks to form a first set of bits; a module configured to expand the first set of bits; a module configured to generate a round key from an existing key; a module configured to add the round key to the expanded bits to generate a second set of bits; a module configured to reduce the second set of bits to generate a set of output bits for a respective round; and a module configured to perform an XOR of set of the output bits with the selected predetermined number of input bits to produce a set of encrypted bits. The system also includes a processor. Each module is configured to control the processor to perform its respective function.

Figure 2A:
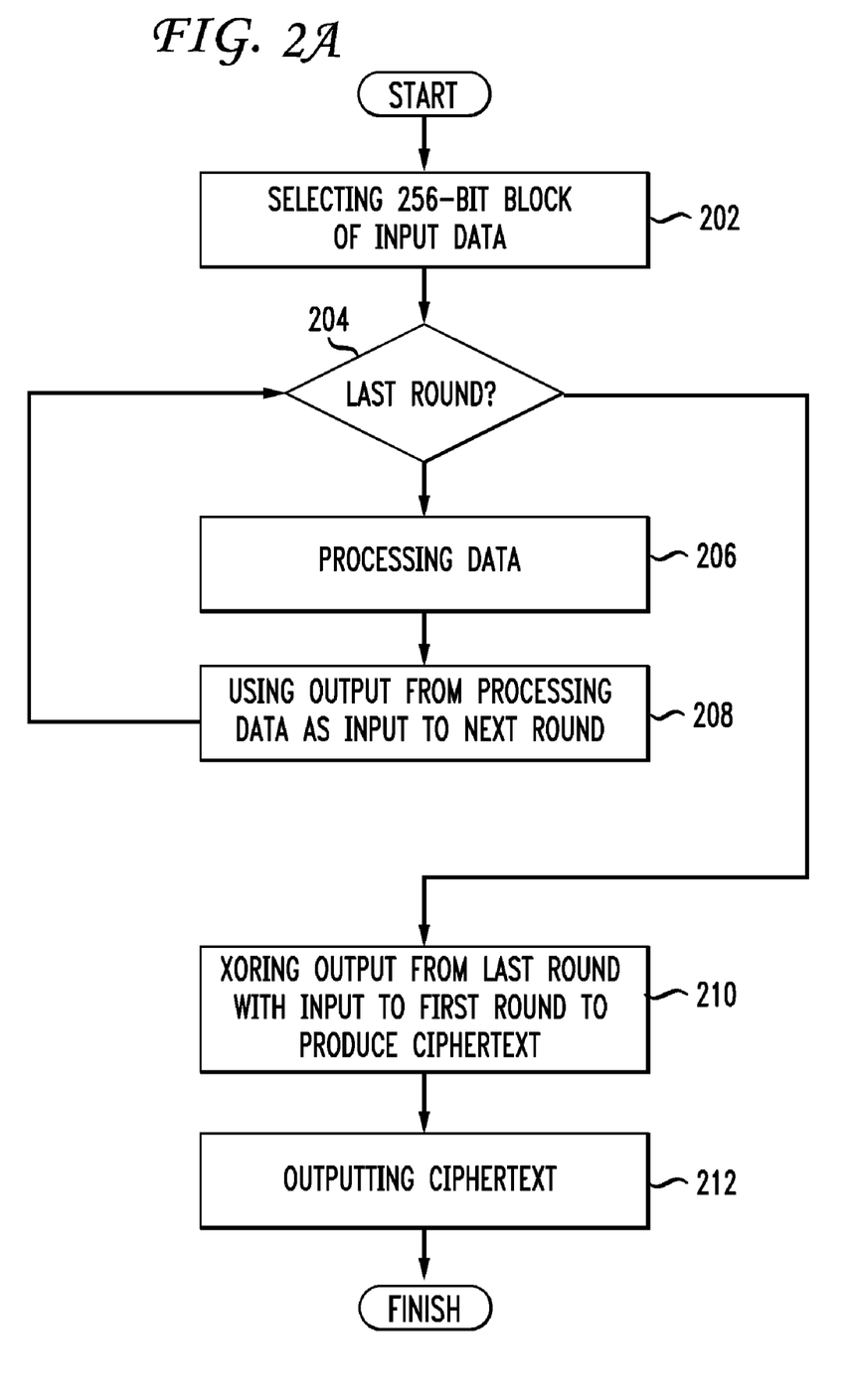
FIG. 2A illustrates an encryption algorithm with random intermediate values.

FIG. 2A illustrates the encryption process utilizing internal random states. The disclosure shall discuss the method as a general system. The system selects 256 bits (or other predetermined group of bits) of input data (202). The system checks if it is last round of the process (204). When it is not the last round, the input data is processed (206) and the output data is used as the input to the next round of processing (208). The method runs for a predetermined number of rounds. When the last round is completed, the system applies an exclusive or (XOR) of the output data from the last round and the input data to the first round to generate encrypted data, or ciphertext (210). The system outputs the ciphertext (212).

Figure 2B:
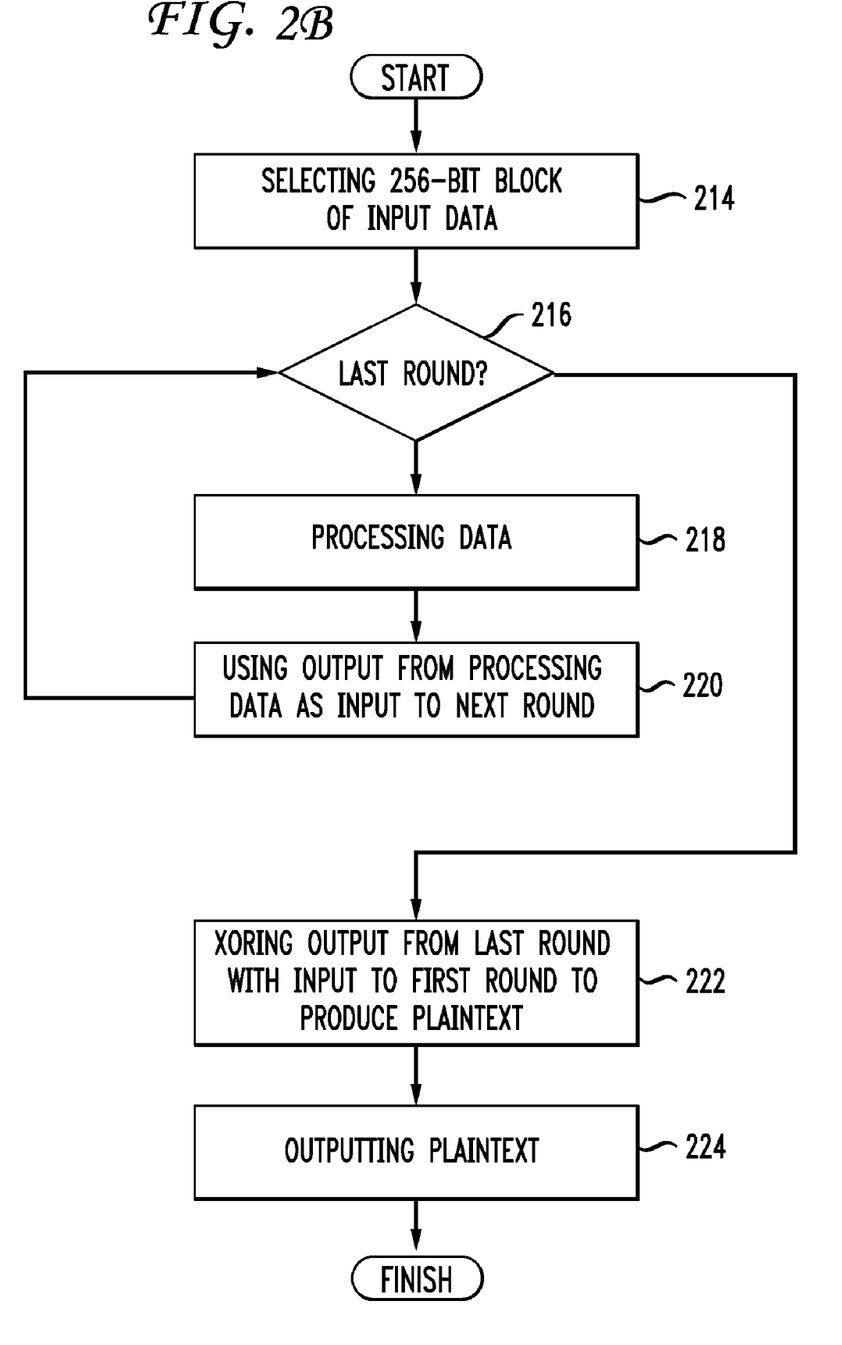
FIG. 2B illustrates a decryption algorithm with random intermediate values.

FIG. 2B illustrates the decryption process utilizing internal random states. The disclosure shall discuss the method as a general system. The system selects 256 bits (or other predetermined group of bits) of input data (214). The system checks if it is last round of the process (216). When it is not the last round, the input data is processed (218) and the output data is used as the input to the next round of processing (220). The method runs for a predetermined number of rounds. When the last round is completed, the system applies an exclusive or (XOR) of the output data from the last round and the input data to the first round to generate decrypted data, or plaintext (222). The system outputs the plaintext (224).

Figure 3:
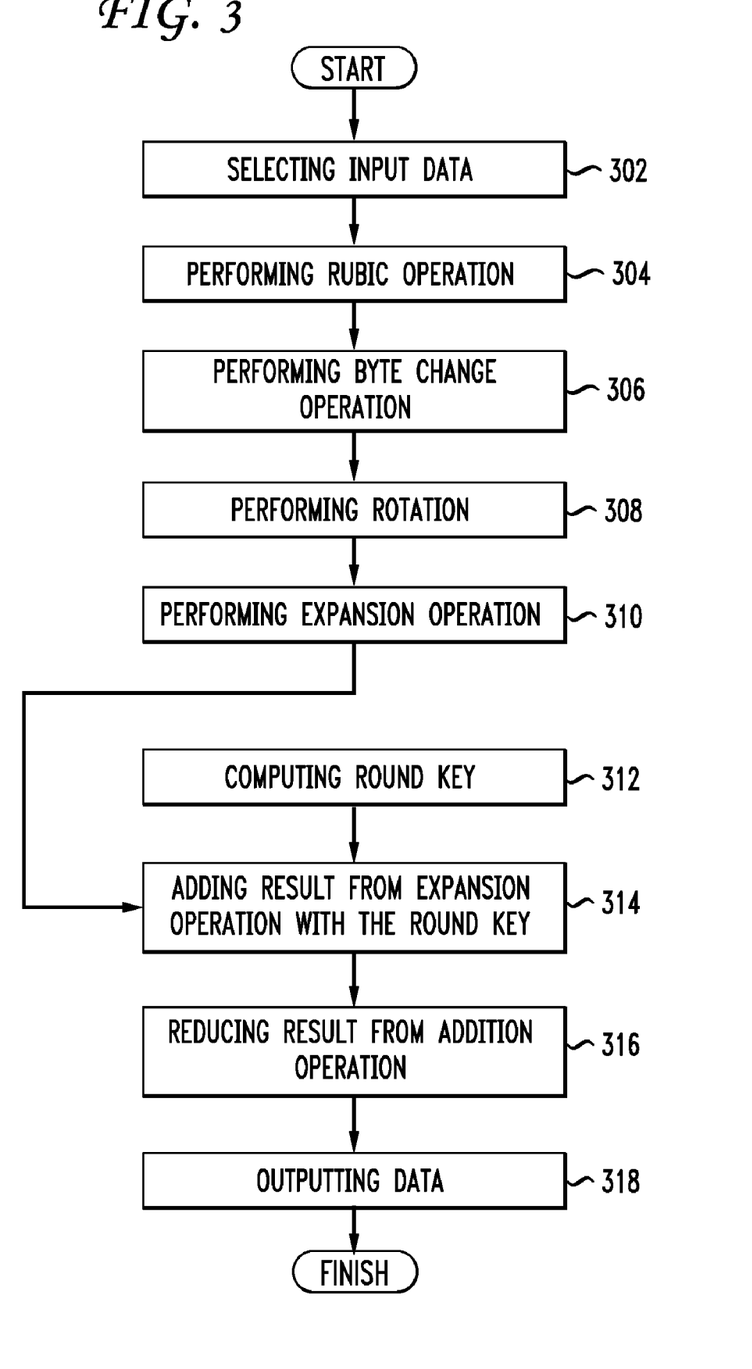
FIG. 3 illustrates the computations performed within each round.

FIG. 3 illustrates data processing within each round of the encryption and decryption processes. Initially, the system selects the input data (302) and performs a rubic operation on the input data (304). The system performs a byte change operation on the output of the rubic operation (306). The system performs a rotation operation on the output of the byte change operation (308). The system performs an expansion operation on the output from the rotation operation (310), and uses the output as input to the add round key operation (314). The system performs the round key operation and generates the round key (312). The round key is input to the add round key operation (314), and the round key and the output from the expansion operation are added together (314). The result from the add round key operation is reduced (316) and the system outputs the data (318).

Figure 4:
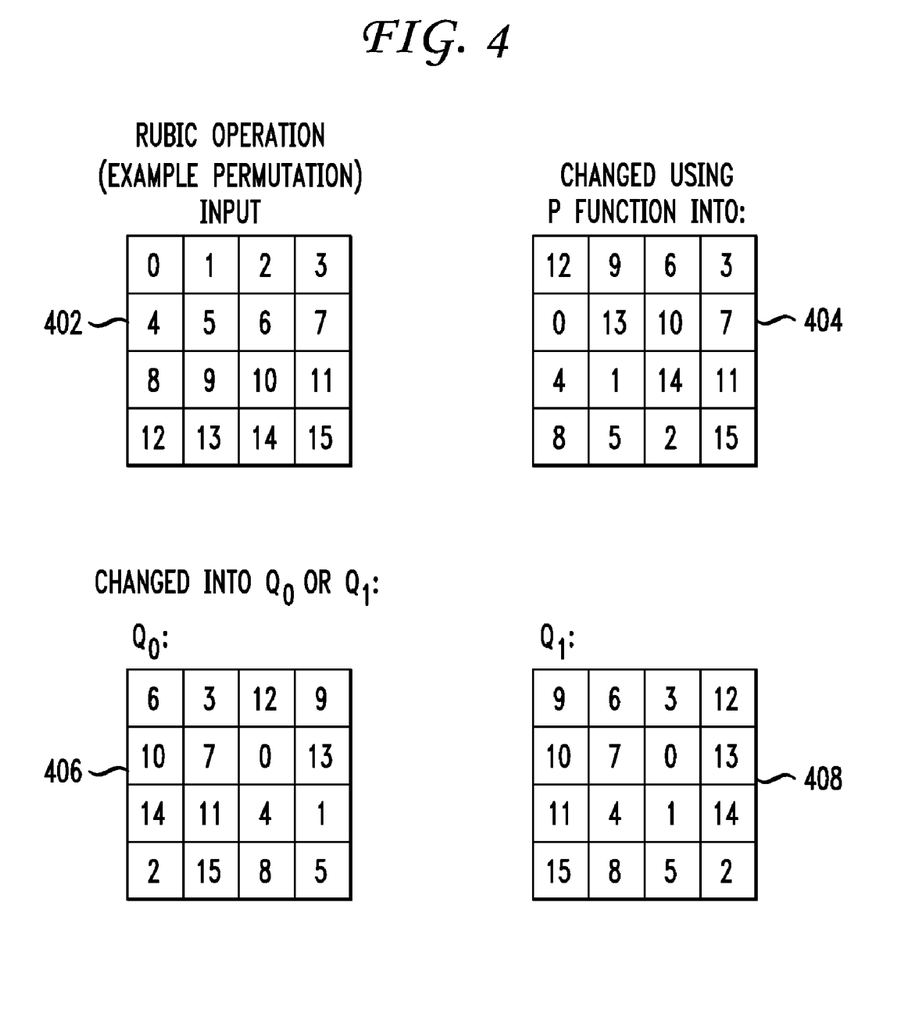
FIG. 4 illustrates the Rubic Operation.

FIG. 4 illustrates the rubic operation (304) performed as a part of the encryption and decryption processes. The 256-bit block of data (any size of data block will do) is decomposed into 16 sub-blocks of 16 bits, or blocks of two bytes. Each sub-block is numbered and arranged into a four-by-four table. Sub-blocks 0-3 make up the first row, 4-7 the second row, 8-11 the third row and 12-15 make up the last row in the table (402). The system changes the table using a function such that the sub-blocks within each column change position (404). The system permutes the resulting table (404) using functions Q0 (406) or Q1 (408) such that the sub-blocks within each row change position. Note that FIG. 4 illustrates a specific example and the other permutations are possible.

The byte change operation (306) is a table look up that operates on bytes of data. The table is 256 bytes in size (or other suitable size) and maps one byte to another. The table is a bijection and many tables are possible to achieve this goal. The table access is defined in one example by the formula: $3*i+8*r \% 256$, where r is the round number and i the block number. Rounds are numbered from 0 to the number of rounds minus 1. Using 256-bits of input, the system constructs the data into 32 8-bit blocks numbered from 0 to 31. For example, inserting i=0 and r=0 results in 0, which is the first entry of the table. The first block in the first round is changed to the first entry of the table. The first block of the second round is changed to the $8^{th}$ entry of the table since i=0 and r=1. Note that the choice in formula is not limiting and the table could be accessed in other ways.

Figure 5:
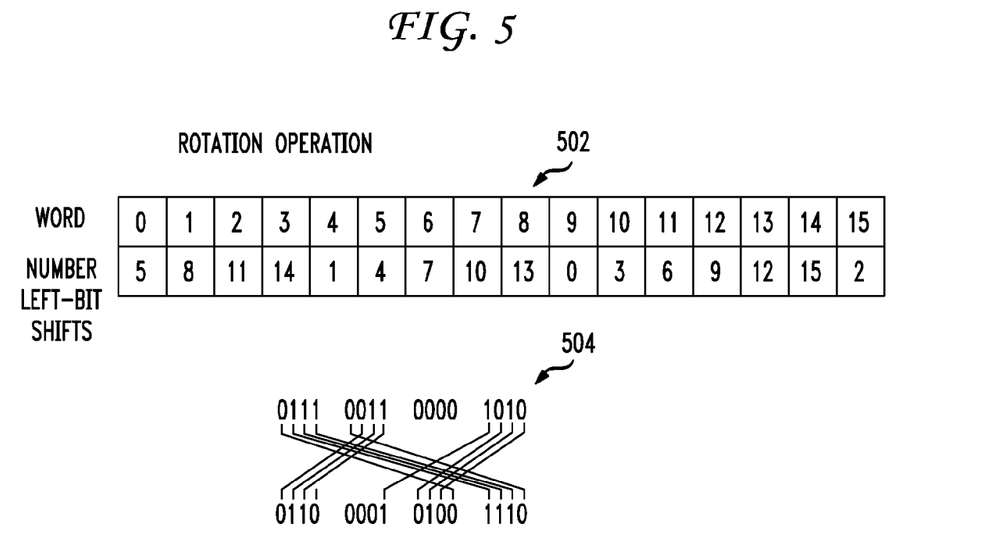
FIG. 5 illustrates the Rotation Operation.

FIG. 5 illustrates the rotation operation (308). The rotation operation operates on 16-bit words. The system numbers each word from 0 to 15 and performs a bitwise rotation to the left on the word. The rotation is defined by the formula: $3*i+5\% 16$, where i is the word number and "%" represents the modulo operator. For instance, word 0 is rotated to the left 5 positions, since i=0 (502). If word 0 were the binary value 0111 0011 0000 1010, after the rotation the value would be 0110 0001 0100 1110 (504). The formulas discussed above that define the rotation are not limiting and other acceptable formulas could be substituted in their place, for instance the word could be rotated using arithmetic operations.

The expansion operation (310) operates on a 256-bit input value assigned to the variable Acc. The operation is defined by the formula: $alpha*Acc^3+beta+lambda*p \bmod (delta*p)$ where p is a prime number greater than $2^{256}$, alpha and beta are deterministic, lambda and delta are random values and "^" denotes the power operator. In another aspect of this disclosure, the inverse of this operation or another expansion operation could be used for a block cipher.

Figure 6:
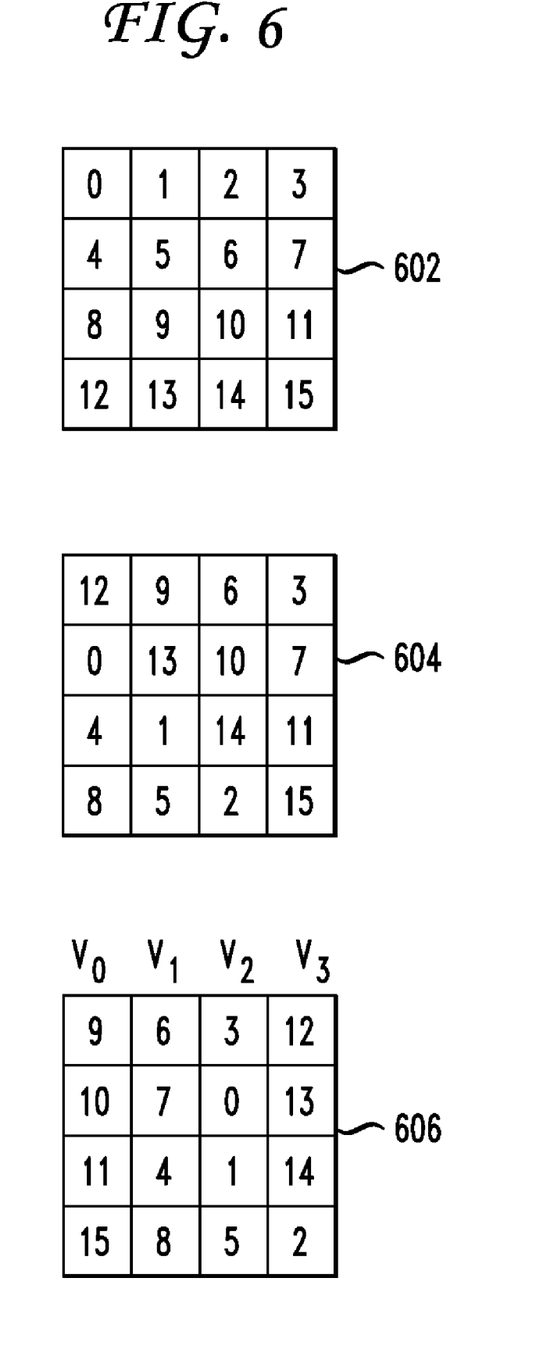
FIG. 6 illustrates the Round Key Generation tables.

FIG. 6 illustrates the round key generation (312), or key scheduling operation. The 256-bit key K is decomposed into 16 16-bit blocks, numbered from 0 to 15 and organized into a matrix. Row 1 of the matrix contains blocks 0 to 3, row 2 contains blocks 4 to 7, row 3 contains 8 to 11 and row 4 contains 12 to 15 (602). First, the system applies the rubic operation to the matrix, where the blocks within each column are permuted (604) and the system applies the Q1 function to the resulting matrix (606). The columns are denoted v0, v1, v2 and v3 (606) and i represents the column number. The variable v4 is defined by applying an exclusive or of v0 and the result of the byte change operation applied to column v3, then adding a constant value. The system computes the variable v5 by performing an exclusive or of v4 with v1, computes v6 by performing an exclusive or of v5 with v2 and computes v7 by performing an exclusive or of v6 with v3. The system computes the variables v8 through v11 the same way as v4 through v7, using the corresponding variables v4 through v7. When i modulo 4 is equal to 0 (i %4==0) vi is computed by applying the byte change operation on v(i−1), then applying an exclusive or of the result of the byte change operation with v(i−4), and a constant value. When i modulo 4 is not equal to 0, vi is computed by applying an exclusive or of v(i−1) with v(i−4). For instance, v8 is computed by applying an exclusive or of the result of the byte change operation applied to v7, v4 and a constant value. The system computes the variable v9 by performing an exclusive or of v8 with v5, computes v10 by performing an exclusive or of v9 with v6, and computes v11 by performing an exclusive or of v10 with v7. Any of the block sizes or data sizes may be varied as would be understood by one of skill in the art.

For round 0, the 256-bit value V0 includes columns v0, v1, v2 and v3. The value VN includes vN, v(N+1), v(N+2), v(N+ 3) where N is the round number. The round key KRN is defined as $KRN=VNA5+teta+gamma*p \bmod (delta*p)$ where gamma and delta are random values, teta is deterministic and p is a large prime greater than 2^256 where the "^" operator denotes the power operator. For example, the round key for round 0 is KR0=V0^5+teta+gamma*p mod (delta*p). The round key for round 1, KR1, is generated with V1 in the same manner as KR0. In this way, the system generates the round keys.

The next step is to perform the add round key operation (314), where the system adds the round key (312) and the output of the expansion operation (310). In classical encryption schemes, the operation is performed using an exclusive or, but that is not the case in this scheme. The round key AccN is defined by the formula: AccN=Acc+KRi mod (delta*p) where KRi is the round key, Acc is the output from the expansion operation, delta is a random value, p is a prime number greater than 2^256 and the "^" operator is the power operator. Next, AccN is reduced modulo p, then further reduced modulo 2^256 (316). Note that the reduction could be any type of reduction such as Montgomery or Barret, which are reductions that are known to those of skill in the art.

Once the reduction has been performed (316), the system finishes the computations for the round and outputs the result from the reduction operation. When it is the last round, the system applies an exclusive or of the round output and the 256-bit input to generate the respective ciphertext or plaintext, depending on the mode of operation. The output of the round is used as input to the next round when the system has not completed all of the rounds for a given input. The number of rounds is variable depending on the level of security necessary. For a good level of security, 10 rounds is sufficient.

The scheme disclosed describes a stream cipher with the property of having intermediate random values. For two executions of the algorithm on the same input data different values are obtained at given stages even when the output is the same. An advantage of this scheme compared to prior art is that this scheme is harder to follow when studied in computer memory, and is useful in protecting against side-channel attacks. The algorithm can be modified slightly to obtain a block cipher, where all of the operations are invertible. In this disclosure, all of the operations are invertible, however once inverted some operations are not efficient enough to be used in practice. Encryption and decryption are performed using the scheme in the same manner. Therefore, embodiments include an encryption system and a decryption system (as well as respective methods, tangible, computer-readable media, and so forth A system for data decryption includes: a module configured to select a predetermined number of input bits and for a predetermined number of rounds: a module configured to construct first blocks using one of output bits from a previous round or the selected input bits; a module configured to permute the first blocks relative to respective block positions; a module configured to decompose the first blocks into a first set of bytes; a module configured to generate a second set of bytes by replacing at least a portion of the first set of bytes using a lookup table; a module configured to construct second blocks using the second set of bytes; a module configured to rotate bits in each block of the second blocks; a module configured to decompose the second blocks to form a first set of bits; a module configured to expand the first set of bits; a module configured to generate a round key from an existing key; a module configured to add the round key to the expanded bits to generate a second set of bits; a module configured to reduce the second set of bits to generate a set of output bits for a respective round; and a module configured to perform an XOR of set of the output bits with the selected predetermined number of input bits to produce a set of decrypted bits. The system also includes a processor. Each module is configured to control the processor to perform its respective function.

Embodiments within the scope of the present invention may also include computer-readable media for carrying or having computer-executable instructions or data structures stored thereon. Such computer-readable media can be any available media that can be accessed by a general purpose or special purpose computer, including the functional design of any special purpose processor as discussed above. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, data structures, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the invention. For example, the principles herein may be modified such that different formulas are used within the key generation process, or the blocks in the rubic operation may be permuted differently than discussed. Those skilled in the art will readily recognize various modifications and changes that may be made to the present invention without following the example embodiments and applications illustrated and described herein, and without departing from the true spirit and scope of the present invention.

We claim:

1. A method for encrypting data, the method comprising:
   selecting, via a processor of a computing device, a predetermined number of input bits;
   for a predetermined number of iterations:
   constructing first blocks using one of output bits from one of a previous iteration and the predetermined number of input bits;
   permuting the first blocks relative to respective block positions;
   decomposing the first blocks into a first set of bytes;
   generating a second set of bytes by replacing at least a portion of the first set of bytes using a lookup table;
   constructing second blocks using the second set of bytes;
   rotating bits in each block of the second blocks;
   decomposing the second blocks to form a first set of bits;
   expanding the first set of bits;
   generating an iteration key from an existing key;
   adding the iteration key to the first set of bits to generate a second set of bits; and
   reducing the second set of bits to generate a set of output bits for a respective iteration; and
   performing an XOR operation on the set of the output bits and the predetermined number of input bits to produce a set of encrypted bits.

2. The method of claim 1, wherein constructing the first blocks further comprises constructing the first blocks using the predetermined number of input bits on a first iteration and constructing the first blocks using the output bits from the previous iteration on subsequent iterations.

3. The method of claim 1, wherein permuting the first blocks further comprises permuting blocks within columns and permuting blocks within rows of a matrix of the first blocks.

4. The method of claim 1, wherein expanding the first set of bits is accomplished by arithmetic operations.

5. The method of claim 4, wherein expanding the first set of bits is accomplished according to an expansion operation represented by $$Acc = alpha*Acc^3 + beta + lambda*p \bmod(delta*p)$$

where Acc is an input value to the expansion operation, alpha and beta are determined, lambda and delta are random values and p is a prime number greater than $2^{256}$.

6. The method of claim 1, wherein rotating bits in each block of the second blocks further comprises shifting each bit at least one of left and right within each block by a determined number of positions for each respective block of the second blocks.

7. The method of claim 1, wherein generating the iteration key further comprises:
   decomposing a key into third blocks;
   permuting the third blocks relative to respective block positions;
   performing a byte change operation on specific blocks of the third blocks;
   applying an XOR operation to a result of the byte change operation and a constant to generate fourth blocks;
   concatenating respective blocks from the third blocks as VN wherein N is an iteration number; and
   performing arithmetic operations utilizing VN.

8. The method of claim 7, wherein performing the arithmetic operations generates an iteration key KRN for iteration number N defined as:

$$KRN = VN^5 + teta + gamma*p \bmod delta*p$$

wherein delta and gamma are random values, teta is determined and p is a prime number greater than $2^{256}$.

9. The method of claim 7 wherein VN is generated using vN, v(N+1), v(N+2) and v(N+3) wherein N is an iteration number.

10. The method of claim 9 wherein vi is defined by:

$$vi = v(i-4) \text{XOR} bc(v(i-1)) \text{XOR} c$$

when i modulo 4 is equal to 0, and is defined by:

$$vi = v(i-1) \text{XOR} v(i-4))$$

when i modulo 4 is not equal to 0,
wherein i is a column number greater than 3, bc is the byte change operation and c is a constant value.

11. The method of claim 1, wherein adding the iteration key and the first set of bits is defined by a polynomial.

12. The method of claim 11, wherein the polynomial is:

$$AccN = Acc + KRi \bmod delta*p$$

wherein Acc is generated during the expansion operation, KRi is the iteration key, delta is a random value and p is a prime number greater than $2^{256}$.

13. The method of claim 1, wherein reducing the second set of bits is performed modulo p, then reduced again modulo $2^{256}$, wherein p is a prime number greater than $2^{256}$.

14. The method of claim 1, wherein operations that are part of the number of iterations are invertible to implement a block cipher.

15. A method for decrypting data, the method comprising:
   selecting, via a processor of a computing device, a predetermined number of input bits;
   for a predetermined number of iterations:
   constructing first blocks using one of output bits from one of a previous iteration and the predetermined number of input bits;
   permuting the first blocks relative to respective block positions;
   decomposing the first blocks into a first set of bytes;
   generating a second set of bytes by replacing at least a portion of the first set of bytes using a lookup table;
   constructing second blocks using the second set of bytes;
   rotating bits in each block of the second blocks;
   decomposing the second blocks to form a first set of bits;
   expanding the first set of bits;
   generating an iteration key from an existing key;
   adding the iteration key to the first set of bits to generate a second set of bits; and
   reducing the second set of bits to generate a set of output bits for a respective iteration; and
   performing an XOR operation on the set of the output bits and the predetermined number of input bits to produce a set of decrypted bits.

16. The method of claim 15, wherein constructing the first blocks further comprises constructing the first blocks using the predetermined number of input bits on a first iteration and constructing the first blocks using the output bits from the previous iteration on subsequent iterations.

17. The method of claim 15, wherein generating the iteration key further comprises:
   decomposing a key into third blocks;
   permuting the third blocks relative to respective block positions;
   performing a byte change operation on specific blocks of the third blocks;
   applying an XOR operation to a result of the byte change operation and a constant to generate fourth blocks;

concatenating respective blocks from the third blocks as VN wherein N is an iteration number; and performing arithmetic operations utilizing VN.

18. The method of claim 17, wherein performing the arithmetic operations generates an iteration key KRN for iteration number N defined as:

$$KRN = VN^5 + teta + gamma*p \bmod delta*p$$

wherein delta and gamma are random values, teta is determined and p is a prime number greater than $2^{256}$.

19. A system for data encryption, the system comprising:

a processor;

a memory storing instructions for controlling the processor to perform steps comprising:

selecting a predetermined number of input bits;

for a predetermined number of iterations performing steps comprising:

constructing first blocks using one of output bits from one of a previous iteration and the predetermined number of input bits;

permuting the first blocks relative to respective block positions;

decomposing the first blocks into a first set of bytes;

generating a second set of bytes by replacing at least a portion of the first set of bytes using a lookup table;

constructing second blocks using the second set of bytes;

rotating bits in each block of the second blocks;

decomposing the second blocks to form a first set of bits;

expanding the first set of bits;

generating a iteration key from an existing key;

adding the iteration key to the first set of bits to generate a second set of bits; and reducing the second set of bits to generate a set of output bits for a respective iteration; and performing an XOR operation on the set of the output bits and the predetermined number of input bits to produce a set of encrypted bits.

20. The system of claim 19, wherein permuting the first blocks further comprises permuting blocks within columns and permuting blocks within rows of a matrix of the first blocks.

21. The system of claim 19, wherein the first set of bits is expanded by arithmetic operations.

22. The system of claim 19, wherein the first set of bits is expanded according to:

$$Acc = alpha*Acc^3 + beta + lambda*p \bmod(delta*p)$$

where Acc is an input value, alpha and beta are determined, lambda and delta are random values, and p is a prime number greater than $2^{256}$.

23. A system for data decryption, the system comprising:

a processor;

a memory storing instructions for controlling the processor to perform steps comprising:

selecting a predetermined number of input bits;

for a predetermined number of iterations, performing steps comprising:

constructing first blocks using one of output bits from a previous iteration or the predetermined number of input bits;

permuting the first blocks relative to respective block positions;

decomposing the first blocks into a first set of bytes;

generating a second set of bytes by replacing at least a portion of the first set of bytes using a lookup table;

constructing second blocks using the second set of bytes;

rotating bits in each block of the second blocks;

decomposing the second blocks to form a first set of bits;

expanding the first set of bits;

generating a iteration key from an existing key;

adding the iteration key to the first set of bits to generate a second set of bits; and reducing the second set of bits to generate a set of output bits for a respective iteration; and performing an XOR operation on the set of the output bits and the predetermined number of input bits to produce a set of decrypted bits.

24. The system of claim 23, wherein generating the iteration key further comprises:

decomposing a key into third blocks;

permuting the third blocks relative to respective block positions;

performing a byte change operation on specific blocks of the third blocks;

applying an XOR operation to a result of the byte change operation and a constant to generate fourth blocks;

concatenating respective blocks from the third blocks as VN wherein N is an iteration number; and performing arithmetic operations utilizing VN.

* * * * *